Oct. 23, 1945.     I. B. GRUBER ET AL     2,387,658
MACHINE FOR BUNDLING TUBULAR ARTICLES AND THE LIKE
Filed July 9, 1943     6 Sheets-Sheet 2

INVENTORS:
IRVING B. GRUBER and
WILLIAM L. ZEMBERRY,
BY John E. Jackson
THEIR ATTORNEY.

Patented Oct. 23, 1945

2,387,658

UNITED STATES PATENT OFFICE 2,387,658

MACHINE FOR BUNDLING TUBULAR ARTICLES AND THE LIKE

Irving B. Gruber and William L. Zemberry, Pittsburgh, Pa., assignors to National Tube Company, a corporation of New Jersey Application July 9, 1943, Serial No. 494,127

15 Claims. (Cl. 100—31)

This invention relates to a machine or apparatus for bundling tubular articles and the like, and particularly, to an improved apparatus or machine for wrapping tying wires around a plurality of tubular articles, such as pipe for bundling the same.

Heretofore, pipe and similar articles were usually prepared for shipment by wrapping manually a wire around a plurality of pipes or articles at a point adjacent each end and near the middle thereof so as to form a bundle thereof. The free ends of the tying wire were then twisted together by means of a tool such as a pair of pliers. Such procedure was not only tedious but consumed a considerable amount of time and involved much expense. It is to a machine or apparatus for wrapping and tying tubular articles, such as pipe and similar articles, together so as to form a bundle thereof that the present invention relates.

Accordingly, it is the general object of the present invention to provide an improved apparatus or machine for bundling tubular articles and the like wherein the tying wire is automatically wrapped around the tubular articles and the ends of the tying wire are twisted together so as to tie securely the tubular articles together into a bundle.

It is another object of this invention to provide an improved machine or apparatus for bundling tubular articles and the like wherein a plurality of spaced apart tying wires are wrapped simultaneously around the tubular articles at spaced apart intervals throughout the length thereof with the free ends of each of the wires simultaneously twisted together to form a completed bundle.

It is a further object of our invention to provide an improved machine or apparatus for bundling tubular articles and the like wherein the feeding of the tying wire into the machine, the wrapping of the wire around the tubular articles, the twisting of the ends of the wire together, and the severing of the wrapped portion of the wire around the articles from the source of supply of the wire, are all done automatically.

It is still another object of the present invention to provide an improved machine or apparatus for applying tying wires to tubular articles and the like which is simple and inexpensive in its construction, and at the same time, efficient and effective in its use.

Various other objects and advantages of this invention will be more apparent in the course of the following specification and will be particularly pointed out in the appended claims.

In the accompanying drawings there is shown, for the purpose of illustration, an embodiment which our invention may assume in practice.

Referring more particularly to the drawings, the improved bundling machine of our invention comprises a longitudinally extending rotatable shaft 2 which is connected, intermediate the length thereof, preferably, to a gear reduction unit 3 which, in turn, is connected to a motor 4. The energization of the motor 4 is controlled, preferably, by means of a limit switch 2ª which, in turn, is controlled by the rotation of the shaft 2 through the action of the gears 2ᵇ and 2ᶜ. There is arranged along the shaft 2, a plurality of spaced apart wrapping and tying units 5, namely, four in the present instance, for applying a plurality of spaced apart tying wires around the tubular articles to be wrapped throughout the length thereof.

Figure 3:
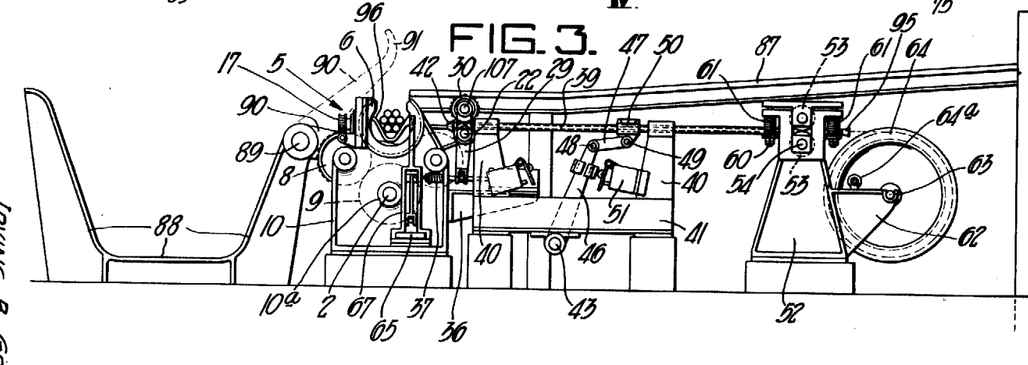
Figure 3 is an end elevational view of our improved bundling machine.
Figure 4:
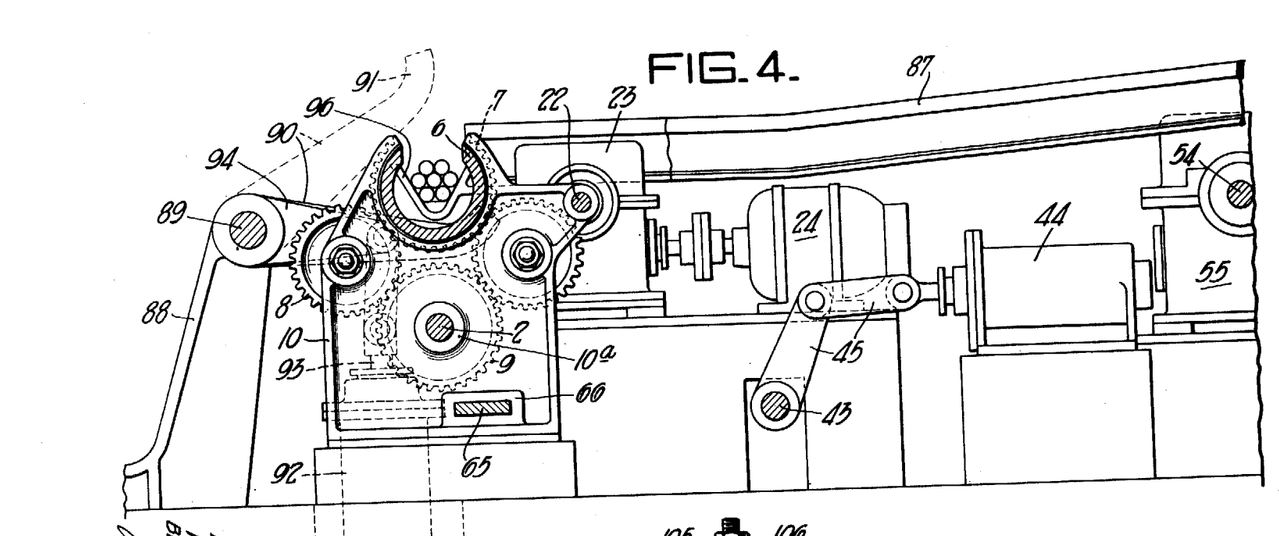
Figure 4 is a sectional view taken on line IV—IV of Figure 2.
Figures 5, 6, 7:
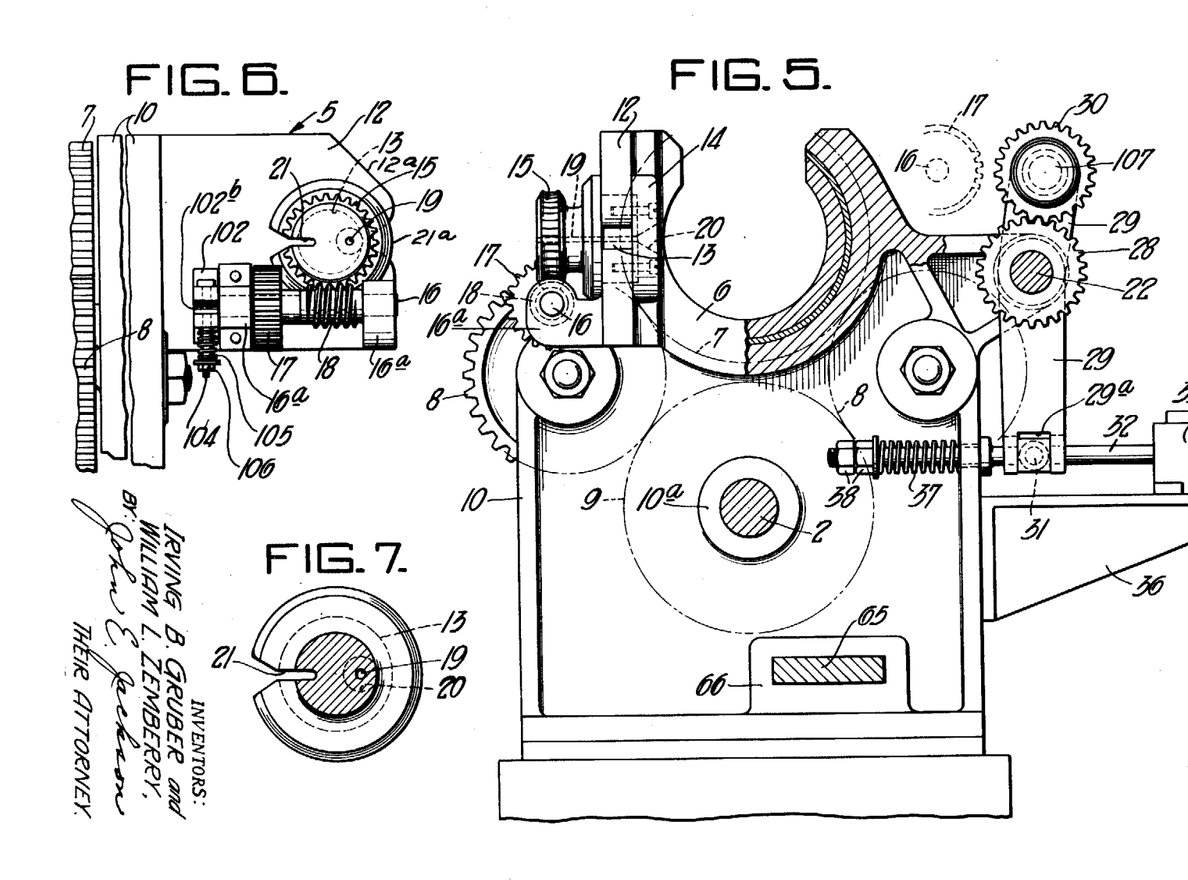
Figure 5 is a view similar to Figure 4 showing the initial position of the twisting mechanism of our machine incorporated with the rotatable head.
Figure 6 is a view showing the twisting mechanism as shown in Figure 5 more in detail.
Figure 7 is a detail view of the rotatable twisting member of the twisting mechanism as shown in Figures 5 and 6.

Each of the wrapping and tying units 5 consists, preferably, of a substantially U-shaped rotor or rotatable head 6 having a gear 7 arranged therewith with a segmental portion removed therefrom as at 7ᵃ so as to provide an opening therein through which the tubular articles to be wrapped are positioned within the same and the U-shaped portion of the head, as more clearly shown in Figures 3, 4, and 5 of the drawings. To either side of and below the gear 7, and which meshes therewith, there is positioned a pinion gear 8, both of which mesh with a gear 9 securely arranged on the shaft 2. The rotatable head 6 together with the gears 8 are mounted on a frame or base 10 of each of the units 5 and the shaft 2 is journaled at spaced intervals in each of the bases 10, as at 10a. The shaft 2 through gear 9 drives the gears 8 which, in turn, drive the head 6 of each of the units through the action of the gear 7 arranged therewith. The two gears 8 which mesh with the segmental or interrupted gear 7, preferably, are placed astride a line through the center of the heads 6 so that the gear 7 meshes with either one or the other of the gears 8, whereby a driving action will be maintained at all times between the shaft 2 and the head 6 no matter what position the segmental gear 7 assumes.

Figure 12:
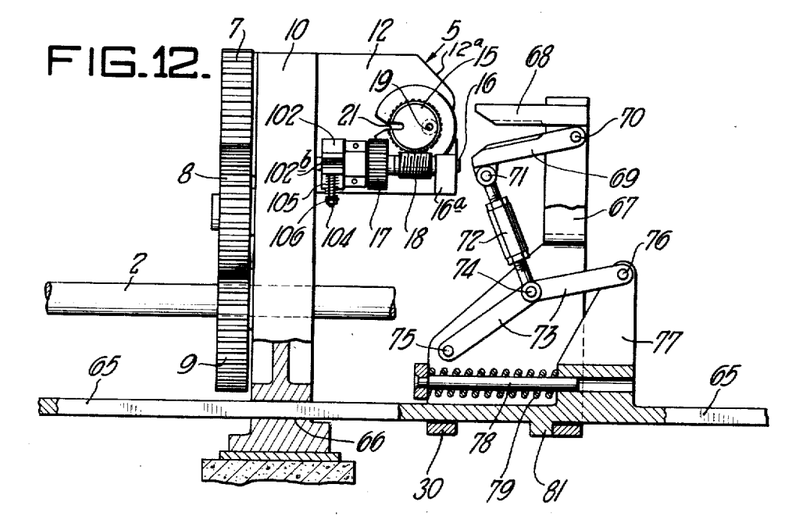
Figure 12 is a side elevational view of one of the tying units showing the tying wire cutting or shearing means, arranged therewith in its normal position.
Figure 13:
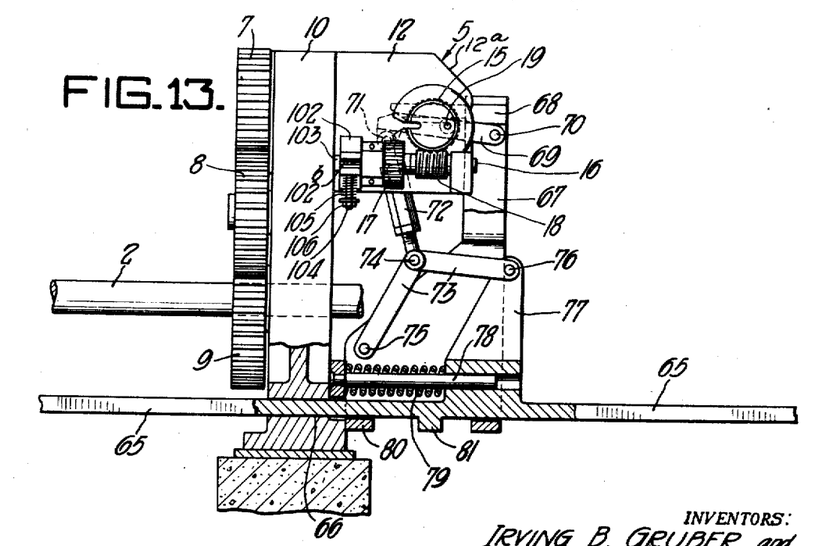
Figure 13 is a view similar to Figure 12 showing the tying wire cutting or shearing means in another or its cutting position.

There is arranged integral with the rotatable head 6 of each of the units 5, an outwardly extending arm-like plate member 12 which carries the tying wire twisting mechanism, as more clearly shown in Figures 5, 6, 8, and 9 of the drawings. Plate member 12 has a diagonally disposed corner portion 12ᵃ, as shown in Figures 6, 12 and 13, the purpose of which will be described hereinafter. The twisting mechanism consists preferably of a worm wheel 15 arranged on the outer side of the plate member 12 and which extends into the face thereof, and has a journal portion 13 integrally arranged therewith by which it is journaled in a hole through the plate member. On the inner side of the journal portion 13 of the worm wheel 15, there is suitably attached thereto a circular plate-like member or cap 14. There is also mounted on the outer side of the plate member 12, a stud shaft 16 which is journaled thereon by means of bearing portions 16ᵃ carried by the plate-like member. The shaft 16 extends substantially perpendicular to the axis of the worm wheel 15 and there is arranged thereon, a gear 17 and a worm 18 which meshes with the worm wheel 15. There is arranged through the worm wheel 15 and the plate or cap 14 attached thereto, a hole 19 which is preferably flared as at 20 at the outer side of the plate or cap 14 and is disposed substantially parallel to the axis of the worm wheel 15 and offset therefrom. In the periphery of both the cap or plate 14 and the worm wheel 15 between two of the teeth thereof, diametrically opposite from the hole 19 therethrough, there is arranged a groove 21 preferably having flared side walls and which extends substantially parallel to the axis of the worm wheel 15 and terminates at a point in the worm wheel and cap substantially the same distance from the axis thereof as the hole 19 is positioned therefrom. A similar groove 21ᵃ is disposed in the outer side of the plate member 12.

Figure 9:
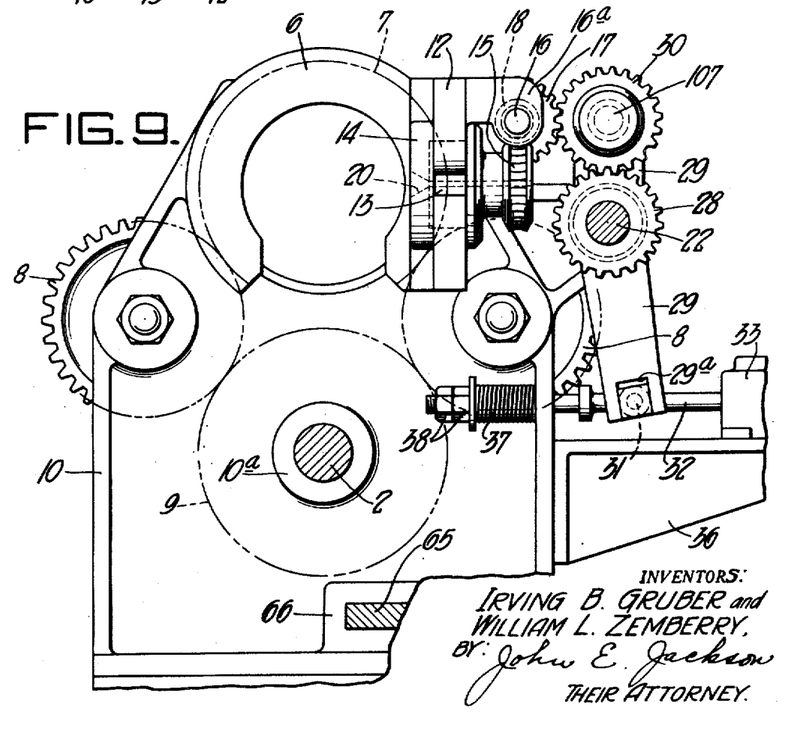
Figure 9 is a view similar to Figure 5 showing the twisting mechanism in position for twisting the ends of the tying wire together.

To one side of the shaft 2 and substantially parallel thereto, there is arranged a longitudinally extending rotatable shaft 22 which extends through and is suitably journaled in the base 10 of each of the wrapping and tying units 5. The shaft 22 intermediate the length thereof is connected preferably to a gear reduction unit 23 which, in turn, is connected to a motor 24. The energization of the motor 24 is controlled preferably by means of a limit switch 25 which, in turn, is controlled by the rotation of the shaft 22 through the action of the gears 26 and 27. On the shaft 22 directly opposite the gear 17 of the twisting mechanism of each of the units 5, there is mounted a gear 28. There is disposed to one side of the gear 28, and mounted for limited rocking movement on the shaft 22, an arm 29 having a gear 30 rotatably journaled in the upper end thereof which meshes with the gear 28. The lower or opposite end of the rocking arm 29 is preferably bifurcated as at 29ᵃ and straddles a pin 31 carried by a plunger or tension rod 32 of a solenoid 33. The solenoid 33 is controlled preferably by means of a suitable limit switch (not shown) preferably arranged on the rotatable head drive. The solenoid 33 is mounted preferably on a bracket 36 attached to the base 10, and the inner end of the tension rod 32 extends through the side wall or flange portion of the base, and there is arranged on this end of the tension rod on the inner side of the flange, preferably, a coil spring 37 and adjusting nuts 38. The gear 30 carried by the rocking arm 29 is adapted to mesh with the gear 17 of the twisting mechanism when the same assumes one position, as shown in Figure 9 of the drawings, in a manner hereinafter to be described.

Figures 10, 11:
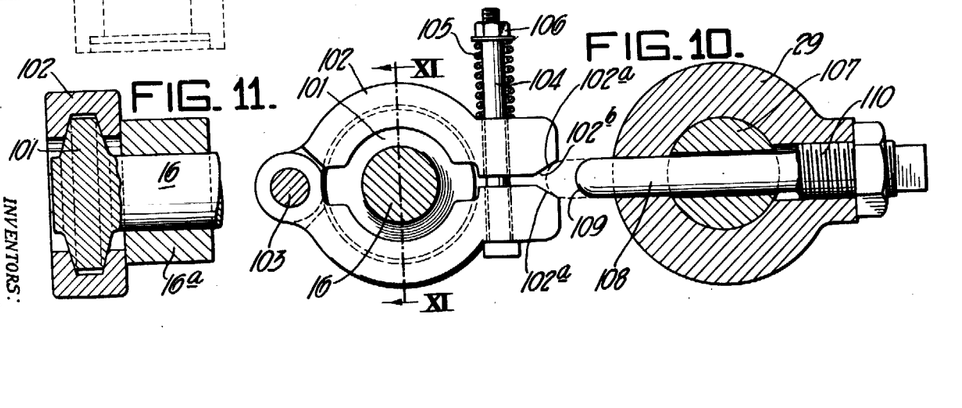
Figure 10 is a cross-sectional view showing the locking means of the twisting mechanism together with the releasing means therefor when the twisting mechanism is positioned as shown in Figure 9.
Figure 11 is a sectional view taken on line XI—XI of Figure 10.

As more clearly shown in Figures 10 and 11 of the drawings, on the shaft 16 to one side of the gear 17 carried thereby in the twisting mechanism of each of the units, there is arranged preferably a circumferential flange or collar portion 101. Around this flange portion 101, there is disposed a split or two piece collar 102 with one side of the halves thereof pivotally attached to the inner bearing portion 16ᵃ preferably by means of a screw or pin 103. There is arranged through aligned holes in the opposite ends of the halves of the split or two piece collar 102, a bolt 104 having a coil spring 105 arranged therearound between the nut 106 thereof and one of the ends of the halves. The inner sides of each of the halves of the collar are preferably beveled as at 102ᵃ so as to provide a tapered opening 102ᵇ between the ends thereof. It is the purpose of the coil spring 105 to force the two halves of the collar together so as to hold the two halves frictionally around and in engagement wtih the side portions and the periphery of the flange 101, so as to prevent the shaft 16 together with the worm wheel 15 from accidentally turning when not functioning mechanically. On the inner side of the arm 29, at a point directly opposite the split collar 102, there is mounted an idler stud shaft 107 on which the gear 30 is mounted. There is arranged diametrically through a portion of the arm and the idler shaft 107, a pin 108 which preferably has a rounded end or nose as at 109. At the opposite end of the pin 108 there is arranged in a portion of the arm 29, preferably a lock set screw 110 for adjusting the position of the pin therein. The nose 109 of pin 108 cooperates with the tapered opening 102ᵇ formed by the opposed beveled faces 102ᵃ of the split collar 102 for a purpose and in a manner to be described.

Figure 8:
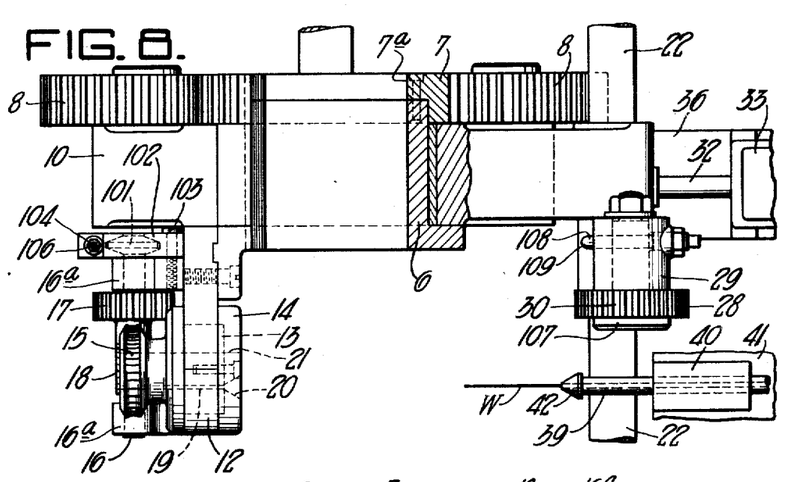
Figure 8 is a plan view of Figure 5 showing the twisting and tying wire feeding mechanisms.

Directly opposite the hole 19 in the worm wheel 15, and to one side of and substantially perpendicular to the axis of the rotatable head 6 of each of the wrapping and tying units 5, as shown in Figures 3 and 8, there is arranged a telescopical tube 39 for guiding the tying wire from the source of supply to the wrapping and twisting mechanism. The tube 39 is carried by the upwardly extending arms 40 of a supporting member or base 41. There is arranged on the inner end of the tube, preferably an enlarged conical-shaped nozzle-like portion 42 which is adapted to cooperate with the flared portion 20 of the hole 19 in the cap or plate 14 of the twisting mechanism, in a manner to be described. To one side of both of the shafts 2 and 22, and substantially parallel thereto, there is arranged another longitudinally extending shaft 43 which is adapted to be oscillated by means of a double-acting pneumatic cylinder 44 arranged intermediate the length thereof through the linkage 45. At each of the wrapping and tying units 5, directly below the tube guide 39 thereof, there is securely arranged on the shaft 43, an upwardly extending crank 46 having the upper end thereof pivotally connected to a link 47, as at 48. The opposite end of the link 47 is pivotally connected, as at 49, to a bracket 50 which is secured to the tube 39. There is arranged on the supporting member 41, preferably to one side of the bell crank 46, a limit switch 51 for controlling the actuation of the pneumatic cylinder 44.

Figure 1:
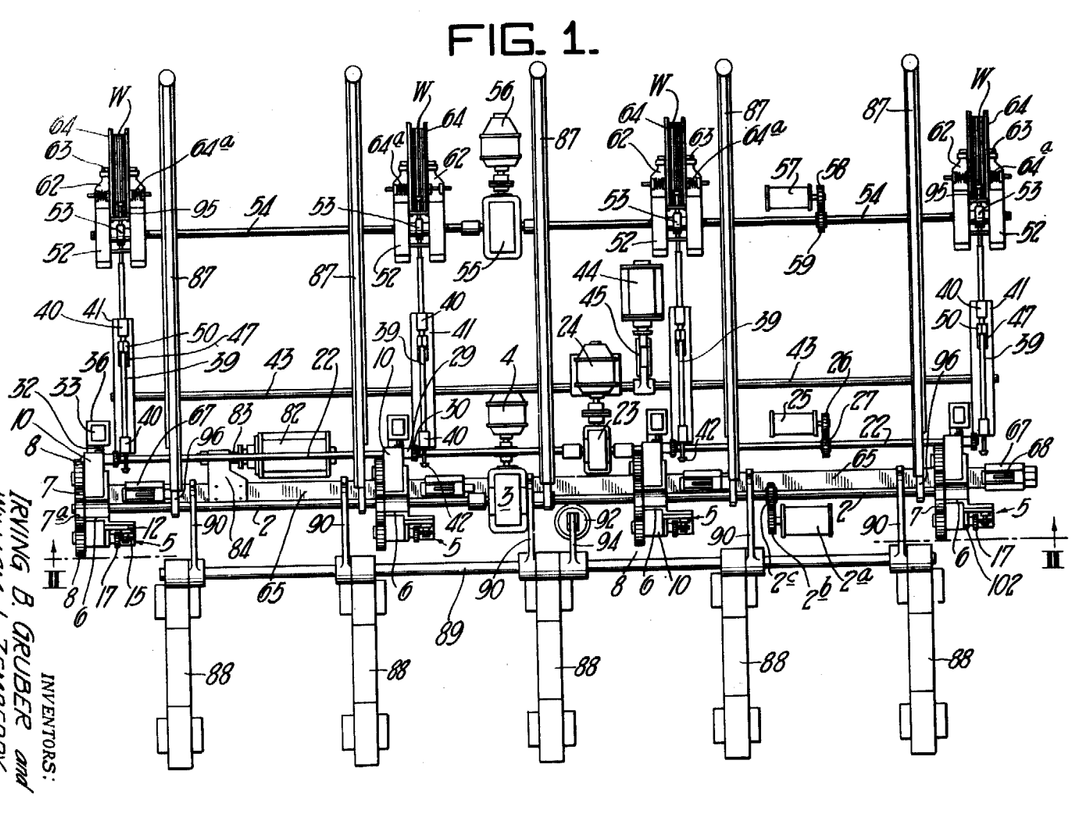
Figure 1 is a plan view of the improved bundling machine of our invention.
Figure 2:
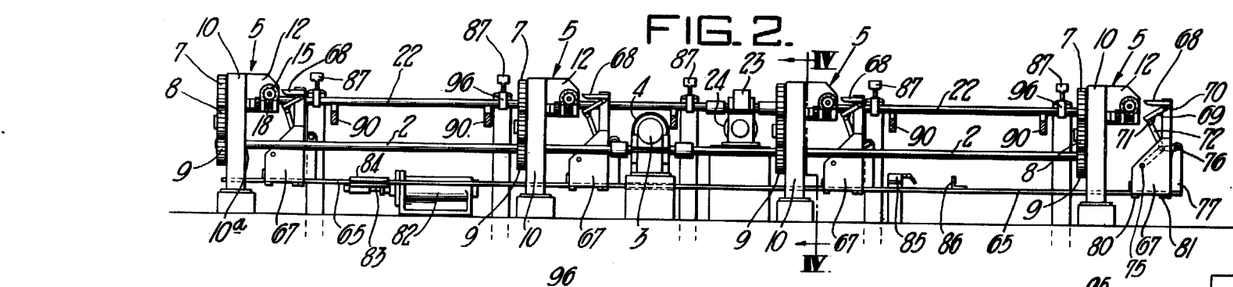
Figure 2 is a sectional view taken on line II—II of Figure 1.

Adjacent the outer end of the tube 39 of each of the wrapping and tying units 5, as shown in Figures 1 and 3 of the drawings, there is mounted on a base or supporting member 52, preferably a pair of opposed rubber friction pinch rollers 53 which are adapted to feed the tying wires from the coil or source of supply into and through the tube 39 and into the rotatable head 6 and the twisting mechanism arranged therewith. There is arranged to one side of the shafts 2, 22 and 43, and substantially parallel thereto, another longitudinally extending rotatable shaft 54, which is connected intermediate the length thereof, to a gear reduction unit 55 which, in turn, is connected preferably to a reversible motor 56. The energization of the motor 56 is controlled, preferably by means of a limit switch 57 which, in turn, is controlled by the rotation of shaft 54 through the action of the gears 58 and 59. One of the pinch rolls, of each of the pair of the pinch rollers 53, of each of the wrapping and tying units, is securely mounted on the shaft 54 which is adapted to drive the rollers upon rotation thereof. The opposite roller of each of the pair of rollers, is frictionally driven by the driving roll, and is maintained in contact therewith preferably by means of coil springs 61 disposed around each of the stud bolts 60. There is carried by the base 52 on the outer side thereof, an outwardly extending portion 62 having a journal portion 63 in which there is rotatably disposed, preferably a flanged bobbin or drum 64 on which the coil of tying wire W is positioned. The rotation of the drum or bobbin 64 is retarded preferably by means of a spring actuated friction device 64ᵃ positioned on the portion 62 to either side of the drum.

At a point below the shaft 2, and substantially parallel thereto, there is arranged a longitudinally extending reciprocable bar-like member 65 which extends between and through the bases 10 of each of the wrapping and tying units 5 and is supported by a bearing member 66 carried thereby. There is slidably mounted on the bar-like member 65 to one side of each of the tying and wrapping units 5, as more clearly shown in Figures 12 and 13, an upwardly extending bracket member 67 having a shear or knife member 68 securely arranged thereon adjacent the top thereof. There is also arranged on the bracket 67 below the shear or knife 68, a movable shear or knife member 69 having one end thereof pivotally attached to the bracket, as at 70, and which is adapted to cooperate with the opposed shear or knife 68 to cut or sever the tying wire in a manner to be described. The lower end of the shear or knife member 69 is pivotally attached as at 71 to one end of an adjustable link 72. The opposite end of the link 72 is pivotally attached to a pair of links 73, as at 74. One of the links 73 is pivotally attached to the slidable bracket member 67, as at 75, with the other link 73 pivotally attached, as at 76, to a bracket member 77 securely mounted on the bar-like member 65 so as to provide a toggle arrangement. There is arranged between the two bracket members 67 and 77, a stud member 78 around which there is disposed a coil spring 79 for the purpose of maintaining the two bracket members in spaced relation relative to each other. On the bottom side of each of the brackets 67 and 77, at a point below the bar-like member 65, there are arranged preferably lug portions 80 and 81, respectively, which are adapted to cooperate with each other for a purpose to be described. At some point along the bar-like member 65, there is arranged preferably a double-acting pneumatic cylinder 82 which is adapted to reciprocate the bar-like member 65. The piston rod 83 of the pneumatic cylinder 82, is preferably attached to a bracket member 84 which, in turn, is suitably connected to the bar-like member 65. Also at some point along the bar-like member 65, there is arranged preferably a limit switch 85 for controlling the actuation of the pneumatic cylinder 82. There is mounted on the bar-like member 65, a switch actuating member 86, which is adapted to cooperate with the limit switch 85 when the bar-like member 65 is moved so that the actuating member is caused to strike the limit switch.

Between each of the wrapping and tying units 5, and to one side of the axial center of the heads 6 thereof, as shown in Figures 1, 3, and 4, there is arranged preferably an inclined rail 87 which extends from a point adjacent the axial center line of the heads and substantially perpendicular thereto to a point out beyond the mechanism of each of the units. The top surface of each of the rails 87 is positioned above the mechanism of each of the wrapping and tying units 5, and the rails are provided for the purpose of rolling the pipe or other tubular articles from the source of supply and down into the heads 6 of the wrapping and tying units 5.

On the other side of the axial center line through the rotatable heads 6, directly opposite from the inner ends of the rails 87, there is arranged a plurality of spaced apart substantially U-shaped members 88 for receiving the bundle of pipe or tubular articles after the wrapping and twisting operations. In the upper end of the inner leg portion of each of the U-shaped members 88, there is suitably journaled a longitudinally extending shaft 89 which is disposed substantially parallel to the shaft 2. Adjacent each of the U-shaped members 88, there is securely arranged on the shaft 89, an arm-like member 90 preferably having the outer end thereof bent upwardly or hooked, as at 91. There is arranged at some point along the shaft 89, preferably a pneumatic cylinder 92 for actuating the shaft with the piston rod 93 of the cylinder preferably attached to a crank member 94 carried by the shaft 89.

The improved bundling machine of our invention operates in the following manner. A coil of wire W is positioned on the bobbin 64 of the supporting member 62 in each of the wrapping and tying units 5, as shown in Figures 1 and 3 of the drawings, and the wire is fed through the tubular guide 95, between the rubber friction rolls 53 and into and through the telescoping tubular guide member 39. The telescopical tubes 39 are then moved forwardly by means of the shaft 43 and pneumatic cylinder 44, through the action of the crank 46 and the connecting link 47 of each of the units so that the conical-shaped nozzle-like portion 42 on the inner end of each of the tubular guide members 39 is positioned in the recess 20 of the hole 19 in the cap 14 of the respective twisting mechanisms of each of the units from the position, as shown in Figure 8. The shaft 54 is then set in motion and rotated by the means of the gear reducer 55 and motor 56. Upon rotation of the shaft 54, it will be seen that the friction feed rollers 53 of each of the units are rotated, and that the wire is drawn from the coil on the bobbin 64 and fed through the tube 39 and into and through the hole 19 of the twisting mechanism. The friction rolls 53 rotate until a length of wire is fed to the head and through the twisting mechanism of each of the units, of sufficient length, to wrap the number of pipes or tubular articles to be bundled. The length of wire fed to the rotatable heads 6 is controlled by means of the limit switch 57 through the action of the gears 58 and 59. In other words, after the proper length of the wire has been fed to each of the units for a single wrapping operation, the limit switch 57 deenergizes the motor 55 thereby arresting the rotation of the shaft 54 and the feed rollers 53 arranged therewith. The guide tube 39 is then moved to its original or retracted position, as shown in Figures 1 and 8, by the pneumatic cylinder 44.

The machine is now ready for actually wrapping and tying the pipes or tubular articles. It is preferable that a single loop of wire, of each of the tie wires, be wrapped around a single pipe or tubular article so as to prevent the tie wires from slipping along the pipes after the same are bundled. To provide such a single wrapping around a pipe with the machine of the present invention, a single pipe is rolled over the rails 87 and positioned in the substantially U-shaped supporting member or saddle 96 arranged adjacent the rotatable head 6 of each of the units 5. The shaft 2 is then rotated by means of the gear reducer unit 3 and the motor 4, and such rotation of the shaft rotates the head 6 of each of the units through the action of the gears 7, 8, and 9. It will be seen that when the single pipe is positioned in the units, it rests upon the tying wire W extending transversely across the axial center of the heads 6, and upon rotation of the heads, the wire is wrapped around the single pipe. Due to the inclined portion 12ª on the plate 12, the wire extending from the guide 39 will be deflected, permititng the heads 6 to rotate without interference therefrom. After the heads 6 have made one revolution and a single wrap or loop has been made around the single pipe positioned in the units, the shaft 2 is arrested from rotation and the remaining pipes or tubular articles adapted to make up a bundle are then rolled over the rails 87 and positioned in the saddle members 96 and the rotatable heads 6, on top of the single pipe and tying wire positioned therein. The shaft 2 is again set in rotative motion, so that the rotatable head 6 of each of the units makes preferably one and one-half revolutions and assumes the position as shown in Figure 9 of the drawings. The rotation of the shaft 2, and the rotatable heads or rotors 6, is controlled by the limit switch 2ª through the action of the gears 2ᵇ and 2ᶜ. In other words, when the rotatable heads 6 complete one and one-half revolutions, the limit switch 2ª deenergizes the motor 4 so that the shaft 2 and each of the rotatable heads 6 are arrested from further rotative movement. The rotatable heads, upon rotation thereof, will wrap the remaining length of tying wire around the pipes or tubular articles, and the tying wires are now ready to be twisted around the pipes so as to securely bundle the same. Since the wire was previously wrapped around one pipe and the rest of the bundle placed thereon, which in effect wrapped the wire a half turn therearound, the one and one-half revolutions of the head 6 complete two full wrappings around the bundle.

Upon one and one-half revolutions of each of the rotatable heads 6, it will be seen that the arm-like portions 12 carried thereby, upon which the twisting mechanism is mounted, are positioned on the side opposite from their starting position of the axial center of the rotatable heads, as shown in Figure 9. In such position, it will be seen that the gear 17 in each of the units arranged on the stud shaft 16, will be positioned directly opposite the gear 30 arranged on the upper end of the pivoted arm 29. While the twisting mechanism of each of the units is so positioned, the arm 29 is made to rotate about its pivotal connection on the shaft 22 by means of the solenoid 33, through the action of the tension rod 32, and the pin 31, thereby loading the coil spring 37 arranged on the outer end of the tension rod. Upon such movement of the arm 29, it will be seen that the gear 30 carried thereby will be brought into meshing relationship with the gear 17 of the twisting mechanism. It is essential that the twisting mechanism of each of the units be synchronized with one another. In order to provide such synchronization, it is necessary that the gears 17 and 30 of each of the units mesh when the hole 19 through the worm wheel 15 is in the same angular position in each of the twisting mechanisms. In other words, these gears should always engage at the same point in their peripheries that they had previously been disengaged. It is the purpose of the split collar 102 to act as a brake so as to lock the shaft 16 together with the worm wheel 15 and a cap or plate 14 against unintentional rotative movement when the gears 17 and 30 are disengaged from each other. When the arm 29 which carries the pin 108 is actuated by the solenoid 33 so as to move the gears 17 and 30 toward each other, the rounded end or nose 109 of the pin is moved into the tapered slot 102ᵇ formed by the opposed beveled faces 102ª of the split collar thereby forcing them apart out of contact with the periphery of the flange 101, as shown in the broken lines of Figure 10 of the drawings, so as to permit the shaft 16 and the worm wheel 15 to rotate by the action of the gears 17 and 30.

The worm 18 is then rotated to turn the worm wheel 15 180 degrees to bring the groove 21 therein and the groove 21ᵃ in the plate 12 into coincidence. The twisting mechanism of each of the units is now in position for the twisting operation. The portion of the wire leading to the coil or bobbin 64, or source of supply, at a point immediately beyond the outer end of the conical-shaped nozzle-like portion 42 of the tube 39, due to tension thereon will then fall into the grooves 21 and 21ᵃ arranged in the periphery of the worm wheel 15 and the cap or plate 14 carried thereby and the plate 12. It will be seen now that the free end of the wire, positioned in the hole 19 which is offset from the axial center of the worm wheel 15 and the other portion of the wire leading to the coil and positioned in the groove 21, are positioned directly opposite each other ready for the twisting operation. The shaft 22 is then set in motion and rotated by means of the gear reduction unit 23 and the motor 24. As the shaft 22 rotates, it will be seen that the worm wheel 15 together with the cap 14 of the twisting mechanism is also rotated due to the action of the worm 18 on the stud shaft 16, and the gears 17, 30, and 28. As the worm wheel 15 is rotated, it will be seen that the free end of the tying wire, and that portion of the wire leading to the coil 64, both of which are positioned in the worm wheel 15 due to the rotation thereof, are twisted together to one side of the bundle so that the length of the wire disposed around the pipe, or tubular articles, is securely tied in position thereon. The rotation of the shaft 22 is controlled by the limit switch 25, through the action of the gears 26 and 27. In other words, after the worm wheel 15 in each of the units has been rotated a predetermined number of times so as to apply the desired amount of twist to the twisted portions of the tie wires, the limit switch 25 deenergizes the motor 24 so that the shaft 22 and the worm wheel 15, are arrested from further rotative movement. The solenoid 33 is then deenergized, and the arm 29 is moved about its pivotal connection by means of the loaded coil spring 37. Upon such movement of this arm, it will be seen that the gear 30 carried thereby is moved out of mesh with the gear 17 of the twisting mechanism in each of the units, and that the pin 108 is moved from position between the beveled faces 102ᵃ, of the split collar 102, as shown in the full lines of Figure 10. The two halves of the split collar are then forced together around the flanges 101 of the shaft 16 by the action of the spring 105 thereby locking again the shaft 16 against rotative movement.

After the wires have been twisted together to one side of the tubular articles, it is necessary to cut that portion of the wire disposed around the bundle from the source of supply or coil of wire on the bobbin 64, and the operation of the means for cutting each of the wires will now be described. The bar-like member 65 is moved to the left, from its initial position as shown in Figure 12 of the drawings, by means of the pneumatic cylinder 82 so that both bracket members 67 and 77, together with the knives or shears 68 and 69, of the respective units will be moved toward the outer end of the twisted portion of the wire of each of the units. Upon such movement of the bar-like member 65, as shown in Figure 13, the upper shear or knife 68 of each of the units will pass over the top of the wire therein, and as the bracket member 67 approaches the base 10 of the respective units, the lug 80 will strike the base and prevent further movement of this bracket. However, the bar-like member is still permitted to move due to the fact that the bracket member 67 is slidably arranged thereon, and upon such continued movement, the bracket member 77 which is securely fixed to the bar-like member 65 will move toward the bracket 67 until the lug portion 81 carried thereby, strikes the lug 80 of the bracket 67. Upon this additional movement of the bar-like member, together with the bracket member 77 carried thereby, it will be seen that the lower knife or shear 69 of each of the units will be moved around its pivotal connection 70 so that the knife 69 is moved upwardly to the bottom side of the wire and toward the upper knife or shear 68, with which it cooperates to cut the wire. It will be understood that the shear or knife 69 is moved in such a manner due to the action of the link 72, and the toggle arrangement of the links 73. As the bar-like member 65 moves along, it will be seen that the upwardly extending switch actuating member 86 carried thereby, will be moved in contact with the limit switch 85, so as to actuate the same which in turn actuates the pneumatic cylinder 82 so as to prevent any further movement of the bar-like member, together with the shearing members carried thereby to the left, as shown in Figure 13 of the drawings. After the tying wires have been severed at the twisted portion, the bar-like member 65 is moved to the right to its initial or retracted position as shown in Figure 12, by means of the pneumatic cylinder 82, and in such movement the brackets 67 and 77 are moved away from each other due to the action of the coil spring 78 positioned therebetween. Upon such movement, it will be seen that the lower knife or shear 69 will be moved downwardly to its retracted or normal position, at a spaced distance from the knife 68 ready for the next shearing or cutting operation.

The motor 56 is then set in motion so as to drive the shaft 54 in a reverse direction from that in which it is driven for the feeding operation. Upon such reverse rotatable movement of the shaft 54, the friction rolls 53 will likewise be driven in a reverse direction from that for feeding the wire, and the rolls 53 are run for a sufficient length of time to withdraw that portion of the wire of each of the units extending beyond the end of the tube 39 and in the rotative path of the rotatable heads 6 into the tube. The shaft 2 is then set in motion so that it will rotate each of the heads 6 one-half a revolution or 180 degrees, so that the wrapped tubular articles or bundle can be removed from the machine. In other words, each of the rotatable heads 6 is rotated so that the twisting mechanism is on the outer side thereof, or at the position it assumes at the time of the beginning of the wrapping operation, as shown in Figures 5 and 8 of the drawings.

Figure 14:
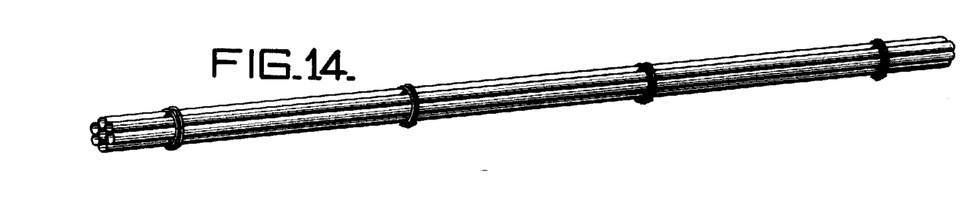
Figure 14 is a perspective view of a completed bundle of pipe or other tubular articles showing the tying wires disposed therearound as applied by our improved bundling machine.

The bundle of tubular articles is then ready to be removed from its position in the machine. The shaft 89 is then oscillated by means of the cylinder 92, and the arm-like members 90 carried by this shaft and which are positioned below the tubular articles throughout the wrapping and twisting operations, are moved upwardly, as shown in the broken lines of Figure 4, and upon such movement it will be seen that they strike the bottom side of the bundle and lift it from its position in the supporting members or saddles 96. When the arm-like members have been moved to a position above the saddle or supporting members, and the bundle of tubular articles has been removed from position in the machine, it will be seen that they roll downwardly over the arm-like members 90 and are delivered into the U-shaped supporting members 88 ready for shipment. It will be seen that the tubular articles are completely bundled and have a tying wire securely arranged therearound at a point adjacent each end thereof, and at two points intermediate the length thereof, as shown in Figure 14 of the drawings.

As a result of our invention, it will be seen that there is provided a wrapping and twisting machine for applying a plurality of tying wires simultaneously around the pipes or tubular articles to be wrapped. It will be understood that operations of wrapping of each of the tying wires around the tubular articles, the twisting of the ends of the respective ends of the tying wires together, and the shearing of the wrapped portion of the tying wires from the source of supply or coil, are all done simultaneously in each of the units. It will also be understood, that the limit switches 2ª, 25, and 57 are set beforehand by the operator, so that the sufficient length of tying wire is fed into each of the rotatable heads 6, in order that a sufficient number of passes of the tying wire are made around the tubular articles, and so that the proper amount of twisting action is applied to the ends of the tying wires when they are twisted together.

While we have shown and described one specific embodiment of our invention, it will be understood that this embodiment is merely for the purpose of illustration and description and that various other forms may be devised within the scope of our invention, as defined in the appended claims.

We claim:

1. Apparatus for tying wire around a plurality of tubular articles or the like simultaneously at spaced apart intervals throughout the length thereof so as to bundle the same comprising a plurality of spaced apart tying units, each of said units including means for supplying and feeding wire thereto, means for holding the tubular articles to be bundled, rotating means for wrapping the wire a plurality of turns around the tubular articles, and means for twisting together the end of the wire and that portion of wire leading to the source of supply at one side of the tubular articles after the wrapping thereof.

2. Apparatus for tying wire around a plurality of tubular articles or the like, as defined in claim 1, including means for severing that portion of the wire wrapped around the tubular articles from that portion leading to the source of supply.

3. Apparatus for typing wire around a plurality of tubular articles or the like simultaneously at spaced apart intervals throughout the length thereof so as to bundle the same comprising a plurality of spaced apart tying units, each of said units including means for holding the tubular articles to be bundled so that they extend between said units, means for rotatably supporting a coil of tying wire, a rotatable wrapping head, means for feeding intermittently from the coil of wire to said head a portion of wire of sufficient length to wrap the tubular articles together, said rotatable head upon rotation thereof adapted to wrap the wire around the tubular articles a plurality of turns, means carried by said head for twisting the free end of the tying wire with that portion of the wire leading to the coil so that the tubular articles are securely bundled together, and means for severing that portion of the tying wire wrapped around the tubular articles from that portion leading to the coil at a point on the outer side of the twisted portion.

4. Apparatus for tying wire around a plurality of tubular articles or the like, as defined in claim 3, including means for removing the bundled tubular articles from position in the units after the wrapping and twisting operations.

5. Apparatus for tying wire around a plurality of tubular articles or the like, as defined in claim 3, wherein the means carried by the head for twisting the free end of the tying wire with that portion of the wire leading to the coil consists of a rotatable member having a hole arranged therethrough substantially parallel to the axis thereof into and through which the free end and the proper length of tying wire is fed and extends with said hole being offset from the axial center of said rotatable member, said rotatable member adapted to rotate on an axis substantially perpendicular to the axis of rotation of said head and tubular articles and having a slot arranged in the periphery thereof diametrically opposite said hole in which that portion of wire leading to the coil is positioned for the twisting operation after the tying wire has been wrapped around the tubular articles, and means for rotating said rotatable member.

6. Apparatus for tying wire around a plurality of tubular articles or the like, as defined in claim 3, including a telescopically arranged tubular member through which the wire passes for guiding the same to the head.

7. Apparatus for tying wire around a plurality of tubular articles or the like, as defined in claim 3, wherein the means for feeding intermittently from the coil of wire to the head a portion of tying wire of sufficient length to wrap the tubular articles together consists of a pair of opposed friction rollers.

8. Apparatus for tying wire around a plurality of tubular articles or the like simultaneously at spaced apart intervals throughout the length thereof so as to bundle the same, comprising a longitudinally extending rotatable shaft, means for driving said shaft, a plurality of spaced apart rotatable wrapping heads arranged along said shaft throughout the length thereof, a plurality of means arranged along said shaft for supporting the tubular articles to be bundled, means arranged between said shaft and each of said rotatable heads for rotating simultaneously each of said heads around the tubular articles, means for feeding from a source of supply simultaneously tying wire to each of said heads, each of said heads upon rotation thereof adapted to wrap the tying wire fed respectively thereto around the tubular articles a plurality of turns, and means for twisting together simultaneously the free end of each of the tying wires and the portion of the wire leading to the source of supply at each of said heads after the same have been wrapped around the tubular articles.

9. Apparatus for tying wire around a plurality of tubular articles or the like, as defined in claim 8, including means for severing simultaneously that portion of each of the tying wires wrapped around the tubular articles on the outer side of the twisted portions from that portion leading to the source of supply of the tying wire.

10. In a wrapping and tying machine for bundling tubular articles or the like, means for supporting the tubular articles to be wrapped, a wrapping head which is adapted to rotate around the tubular articles, means for feeding a tying wire from a source of supply to said head, said head upon rotation thereof adapted to wrap the wire around the tubular articles, and means carried by said head for twisting together the free end of the tying wire and that portion of the wire leading to the source of supply after the tying wire has been wrapped around the tubular articles.

11. In a wrapping and tying machine for bundling tubular articles or the like, means for supporting the tubular articles to be wrapped, a wrapping head which is adapted to rotate around the tubular articles, means for feeding a tying wire from a source of supply to said head, said head upon rotation thereof adapted to wrap the wire around the tubular articles, means carried by said head for twisting together the free end of the tying wire and that portion of the wire leading to the source of supply after the tying wire has been wrapped around the tubular articles, and means for severing that portion of the tying wire wrapped around the tubular articles from that portion of the wire leading to the source of supply at a point on the other side of the twisted portion.

12. In a wrapping and tying machine for bundling tubular articles or the like, means for supporting the tubular articles to be wrapped, a wrapping head mounted for rotation around the tubular articles, means for rotatably supporting a coil of tying wire, means for feeding intermittently a sufficient length of the tying wire from said coil to said head to wrap the tubular articles, means carried by said head for receiving and holding the amount of tying wire fed thereto, said head upon rotation thereof adapted to wrap that portion of the wire fed thereto around the tubular articles, and means carried by said head for twisting together the free end of the tying wire and that portion leading to the coil of wire.

13. In a wrapping and tying machine for bundling tubular articles or the like, means for supporting the tubular articles to be wrapped, a wrapping head mounted for rotation around the tubular articles, means for rotatably supporting a coil of tying wire, means for feeding intermittently a sufficient length of the tying wire from said coil to said head, means carried by said head for receiving and holding the amount of tying wire fed thereto, said head upon rotation thereof adapted to wrap that portion of the wire fed thereto around the tubular articles, means carried by said head for twisting together the free end of the tying wire and that portion leading to the coil of wire, and means for severing that portion of the wire wrapped around the tubular articles from that portion of the wire leading to the coil at a point beyond the twisted portion.

14. In a wrapping and tying machine for bundling tubular articles or the like, a rotatable substantially U-shaped head, means for supporting the tubular articles to be wrapped so that the same are disposed between the leg portions of the U-shaped head, means for rotating said head around the tubular articles, means for feeding a tying wire to said head, said head upon rotation thereof adapted to wrap the tying wire around the tubular articles disposed therein, and means carried by said head for twisting together the free end of the tying wire and that portion of the tying wire leading to the source of supply.

15. In a wrapping and tying machine for bundling tubular articles or the like, a rotatable substantially U-shaped head means for supporting the tubular articles to be wrapped so that the same are disposed between the leg portions of said U-shaped head, means for rotating said head around the tubular articles, means for feeding a tying wire to said head, said head upon rotation thereof adapted to wrap the tying wire around the tubular articles disposed therein, a rotatable member carried by said head having a hole arranged therethrough substantially parallel to the axis thereof for receiving the tying wire with the hole being offset from the axial center thereof, said rotatable member adapted to rotate about an axis disposed substantially perpendicular to the axis of rotation of said head and the tubular articles, means for rotating said rotatable member, said rotatable member having a groove arranged in the periphery thereof diametrically opposite said hole therein, one of the ends of said tying wire adapted to be positioned in said hole whereby the wire is wrapped around the tubular articles upon rotation of said head and the other end positioned in said groove after the tying wire has been wrapped around the tubular articles, with the end of the wire and that portion of the wire leading to the source of supply adapted to be twisted together to one side of the bundle upon rotation of said rotatable member after the tubular articles have been wrapped.

IRVING B. GRUBER.
WILLIAM L. ZEMBERRY.

---

CERTIFICATE OF CORRECTION.

Patent No. 2,387,658.  October 23, 1945.

IRVING B. GRUBER, ET AL.

It is hereby certified that error appears in the printed specification of the above numbered patent requiring correction as follows: Page 7, first column, line 25, claim 11, for "other" read --outer--; and that the said Letters Patent should be read with this correction therein that the same may conform to the record of the case in the Patent Office.

Signed and sealed this 12th day of February, A. D. 1946.

Leslie Frazer (Seal)  First Assistant Commissioner of Patents.

tubular articles, means for feeding a tying wire from a source of supply to said head, said head upon rotation thereof adapted to wrap the wire around the tubular articles, and means carried by said head for twisting together the free end of the tying wire and that portion of the wire leading to the source of supply after the tying wire has been wrapped around the tubular articles.

11. In a wrapping and tying machine for bundling tubular articles or the like, means for supporting the tubular articles to be wrapped, a wrapping head which is adapted to rotate around the tubular articles, means for feeding a tying wire from a source of supply to said head, said head upon rotation thereof adapted to wrap the wire around the tubular articles, means carried by said head for twisting together the free end of the tying wire and that portion of the wire leading to the source of supply after the tying wire has been wrapped around the tubular articles, and means for severing that portion of the tying wire wrapped around the tubular articles from that portion of the wire leading to the source of supply at a point on the other side of the twisted portion.

12. In a wrapping and tying machine for bundling tubular articles or the like, means for supporting the tubular articles to be wrapped, a wrapping head mounted for rotation around the tubular articles, means for rotatably supporting a coil of tying wire, means for feeding intermittently a sufficient length of the tying wire from said coil to said head to wrap the tubular articles, means carried by said head for receiving and holding the amount of tying wire fed thereto, said head upon rotation thereof adapted to wrap that portion of the wire fed thereto around the tubular articles, and means carried by said head for twisting together the free end of the tying wire and that portion leading to the coil of wire.

13. In a wrapping and tying machine for bundling tubular articles or the like, means for supporting the tubular articles to be wrapped, a wrapping head mounted for rotation around the tubular articles, means for rotatably supporting a coil of tying wire, means for feeding intermittently a sufficient length of the tying wire from said coil to said head, means carried by said head for receiving and holding the amount of tying wire fed thereto, said head upon rotation thereof adapted to wrap that portion of the wire fed thereto around the tubular articles, means carried by said head for twisting together the free end of the tying wire and that portion leading to the coil of wire, and means for severing that portion of the wire wrapped around the tubular articles from that portion of the wire leading to the coil at a point beyond the twisted portion.

14. In a wrapping and tying machine for bundling tubular articles or the like, a rotatable substantially U-shaped head, means for supporting the tubular articles to be wrapped so that the same are disposed between the leg portions of the U-shaped head, means for rotating said head around the tubular articles, means for feeding a tying wire to said head, said head upon rotation thereof adapted to wrap the tying wire around the tubular articles disposed therein, and means carried by said head for twisting together the free end of the tying wire and that portion of the tying wire leading to the source of supply.

15. In a wrapping and tying machine for bundling tubular articles or the like, a rotatable substantially U-shaped head means for supporting the tubular articles to be wrapped so that the same are disposed between the leg portions of said U-shaped head, means for rotating said head around the tubular articles, means for feeding a tying wire to said head, said head upon rotation thereof adapted to wrap the tying wire around the tubular articles disposed therein, a rotatable member carried by said head having a hole arranged therethrough substantially parallel to the axis thereof for receiving the tying wire with the hole being offset from the axial center thereof, said rotatable member adapted to rotate about an axis disposed substantially perpendicular to the axis of rotation of said head and the tubular articles, means for rotating said rotatable member, said rotatable member having a groove arranged in the periphery thereof diametrically opposite said hole therein, one of the ends of said tying wire adapted to be positioned in said hole whereby the wire is wrapped around the tubular articles upon rotation of said head and the other end positioned in said groove after the tying wire has been wrapped around the tubular articles, with the end of the wire and that portion of the wire leading to the source of supply adapted to be twisted together to one side of the bundle upon rotation of said rotatable member after the tubular articles have been wrapped.

IRVING B. GRUBER.
WILLIAM L. ZEMBERRY.

CERTIFICATE OF CORRECTION.

Patent No. 2,387,658.     October 23, 1945.

IRVING B. GRUBER, ET AL.

It is hereby certified that error appears in the printed specification of the above numbered patent requiring correction as follows: Page 7, first column, line 25, claim 11, for "other" read --outer--; and that the said Letters Patent should be read with this correction therein that the same may conform to the record of the case in the Patent Office.

Signed and sealed this 12th day of February, A. D. 1946.

Leslie Frazer (Seal)     First Assistant Commissioner of Patents.